United States Patent [19]
Wilkinson et al.

[11] Patent Number: 5,252,410
[45] Date of Patent: Oct. 12, 1993

[54] LIGHTWEIGHT FUEL CELL MEMBRANE ELECTRODE ASSEMBLY WITH INTEGRAL REACTANT FLOW PASSAGES

[75] Inventors: David P. Wilkinson; Henry H. Voss, both of North Vancouver; Keith B. Prater, Vancouver, all of Canada

[73] Assignee: Ballard Power Systems Inc., North Vancouver, Canada

[21] Appl. No.: 759,463

[22] Filed: Sep. 13, 1991

[51] Int. Cl.$^5$ .................................................. H01M 8/04
[52] U.S. Cl. ........................................ 429/33; 429/26; 429/32; 429/34
[58] Field of Search ........................ 429/26, 32, 33, 34

[56] References Cited

U.S. PATENT DOCUMENTS

| | | |
|---|---|---|
| 3,297,484 | 1/1967 | Niedrach . |
| 3,554,809 | 1/1971 | Craft . |
| 4,175,165 | 11/1979 | Adlhart . |
| 4,279,970 | 7/1981 | Breault et al. . |
| 4,345,008 | 8/1982 | Breault .................... 429/26 |
| 4,826,741 | 5/1989 | Aldhart et al. ............ 429/32 |
| 4,894,355 | 1/1990 | Takeuchi et al. . |
| 4,929,517 | 5/1990 | Luoma et al. ............. 429/34 |
| 4,977,041 | 12/1990 | Schiowaza et al. ........ 429/26 |

FOREIGN PATENT DOCUMENTS 0080129 6/1983 European Pat. Off. .
0093268 7/1981 Japan .

OTHER PUBLICATIONS

"Integrated Electrode Substrate Of Phosphoric Acid Fuel Cell (KES-1)", Fukuda et al., Oct. 1986.

"Electrode Substrate For Phosphoric Acid Fuel Cell", Miwa et al. (date unknown).

*Primary Examiner*—Prince Willis, Jr.
*Assistant Examiner*—M. Nuzzolillo
*Attorney, Agent, or Firm*—McAndrews, Held & Malloy, Ltd.

[57] ABSTRACT

An electrochemical fuel cell is provided for converting a fuel reactant stream and an oxidant reactant stream to a reaction product stream and electrical energy. The fuel cell includes a membrane electrode assembly interposed between two separator layers. The separator layers are formed of thin electrically conductive sheet material which is substantially impermeable to the fuel and oxidant reactant streams. The membrane electrode assembly comprises first and second electrode layers formed of porous electrically conductive sheet material. The electrode layers have a catalyst associated therewith, and an ion exchange membrane is interposed between the first and second electrode layers. The electrode layers include passages, such as the interstitial spaces within the electrode material or grooves formed in the surface of the electrode material, for flowing a reactant stream between an inlet and outlet within the electrode layer. The incorporation of the reactant flow passages within the electrode material permits the use of thin, lightweight separator layers, thus providing higher power-to-volume and power-to-weight ratios than conventional fuel cells having reactant flow passages engraved, milled or molded in the separator plates.

31 Claims, 10 Drawing Sheets

LIGHTWEIGHT FUEL CELL MEMBRANE ELECTRODE ASSEMBLY WITH INTEGRAL REACTANT FLOW PASSAGES

FIELD OF THE INVENTION

The present invention relates to electrochemical fuel cells employing solid polymer ion exchange membranes. More particularly, the present invention relates to a membrane electrode assembly for electrochemical fuel cells in which the reactant flow passages are integral with the electrode material. The present invention permits the construction of lightweight, low volume fuel cells having favorable power output characteristics.

BACKGROUND OF THE INVENTION

Electrochemical fuel cells generate electrical energy by converting chemical energy derived from a fuel directly into electrical energy by the oxidation of the fuel in the cell. A typical fuel cell includes an anode, a cathode and an electrolyte. Fuel and oxidant are supplied to the anode and cathode, respectively. At the anode, the fuel permeates the electrode material and reacts at the catalyst layer to form cations, which migrate through the electrolyte to the cathode. At the cathode, the oxygen-containing gas supply reacts at the catalyst layer to form anions. The anions formed at the cathode react with the cations to form a reaction product. The fuel cell generates a usable electric current and the reaction product is removed from the cell.

In electrochemical fuel cells employing hydrogen as the fuel and oxygen-containing air (or substantially pure oxygen) as the oxidant, a catalyzed reaction at the anode produces hydrogen cations from the fuel supply. The ion exchange membrane facilitates the migration of hydrogen ions (protons) from the anode to the cathode. In addition to conducting hydrogen cations, the membrane isolates the hydrogen fuel stream from the oxidant stream, typically comprising oxygen-containing air. At the cathode, oxygen reacts at the catalyst layer to form anions. The anions formed at the cathode react with the hydrogen ions that have crossed the membrane to form liquid water as the reaction product.

The anode and cathode reactions in such fuel cells is shown in equations (1) and (2) below:

Anode reaction $H_2 \rightarrow 2H^+ + 2e^-$ (1)

Cathode reaction $1/2 O_2 + 2H^{30\ 2} + 2e^- \rightarrow H_2O$ (2)

Solid polymer fuel cells generally contain a membrane electrode assembly ("MEA") consisting of a solid polymer electrolyte or ion exchange membrane disposed between two electrodes formed of porous, electrically conductive sheet material. The electrodes are typically formed of carbon fiber paper, and are usually impregnated or coated with a hydrophobic polymer, such as polytetrafluoroethylene. The MEA contains a layer of catalyst at each membrane/electrode interface to induce the desired electrochemical reaction. A finely divided platinum catalyst is typically employed.

In conventional fuel cells, the MEA is disposed between two rigid, electrically conductive separator plates, each of which has at least one flow passage or groove engraved, milled or molded in the surface facing the MEA. These separator plates, sometimes referred to as flow field plates, are typically formed of graphite. The flow passages in the separator plates direct the fuel and oxidant to the respective electrodes, namely, the anode on the fuel side and the cathode on the oxidant side. The separator plates are electrically coupled in series to provide a path for conducting electrons between the electrodes.

In conventional single cell arrangements, separator plates are located on both the anode and cathode sides of each individual fuel cell. The separator plates intimately contact the respective electrodes to provide a conductive path to carry electrons formed at the anode to the cathode to complete the electrochemical reaction. The separator plates thus perform several functions: (1) they act as current collectors, (2) they provide mechanical support for the electrodes, (3) they provide access channels for the fuel and oxidant to the respective anode and cathode surfaces, and (4) they provide channels for the removal of water formed during operation of the cell.

Two or more individual fuel cells can be connected together in series or in parallel to increase the overall power output of the assembly. In such arrangements, the cells are typically connected in series, wherein one side of a given separator plate contacts the anode of one cell and the other side of the separator plate contacts the cathode of the adjacent cell. Such a series connected multiple fuel cell arrangement is referred to as a fuel cell stack, and is usually held together by tie rods and end plates. The stack typically includes feed manifolds or inlets for directing fuel (substantially pure hydrogen, methanol reformate or natural gas reformate) to the flow field passages of the separator plate on the anode side of each fuel cell and oxidant (substantially pure oxygen or oxygen-containing air) to the flow field passages of the separator plate on the cathode side of each fuel cell. The stack also usually includes a feed manifold or inlet for directing the coolant fluid, typically water, to interior channels within the stack to absorb heat generated by the exothermic reaction of hydrogen and oxygen within the fuel cells. The stack also generally includes exhaust manifolds or outlets for expelling unreacted fuel carrying entrained water and for expelling unreacted oxidant carrying entrained water, as well as an outlet manifold for the coolant water exiting the stack.

Perfluorosulfonic ion exchange membranes, such as those sold by DuPont under its Nafion ® trade designation, have been found effective for use in electrochemical fuel cells. Nafion ® membranes must be hydrated with water molecules for ion transport to occur. Such hydration typically occurs by humidifying the fuel and oxidant streams prior to introducing the streams into the cell.

A new type of experimental perfluorosulfonic ion exchange membrane, sold by Dow under the trade designation XUS 13204.10, has also been found effective for use in electrochemical fuel cells. Like Nafion ® membranes, the Dow experimental membranes appear to require some hydration to effect hydrogen ion transport.

In fuel cells employing hydrogen as the fuel and oxygen as the oxidant, the fuel can be supplied in the form of substantially pure hydrogen or as a hydrogen-containing reformate as, for example, the product of the reformation of methanol and water or reformation of natural gas. Similarly, the oxidant can be supplied in the form of substantially pure oxygen or oxygen-containing air. The fuel cells are typically flooded with fuel and oxidant at constant pressure. Pressure is generally controlled by pressure regulators at the source of the fuel and oxidant reactant streams. When an electrical load is placed on the circuit bridging the electrodes, fuel and oxidant are consumed in direct proportion to the electrical current drawn by the load.

As previously stated, a fuel cell stack usually includes a feed manifold or inlet for directing the coolant fluid, typically water, to interior channels within the stack to absorb heat generated by the exothermic reaction of hydrogen and oxygen within the fuel cells. In conventional designs, the interior coolant channels are generally formed by the cooperating surfaces of two separator plates, one of which contains grooves engraved, milled or molded in its surface and the other of which is planar. The coolant channels are located at periodic intervals along the stack. In the present invention, the separator plates are too thin to have coolant grooves formed in their surfaces. Consequently, the fuel cell stacks of the present invention employ separate cooling jackets or layers having grooves formed therein which cooperate with the planar surface of an adjacent separator plate to form the coolant channels. Alternatively, the membrane electrode assembly itself could be formed with coolant channels or capillaries, such as, for example, tubes running through the electrode sheet material for carrying the coolant through the assembly, thereby eliminating the need for a separate coolant jacket. In addition, cooling could be accomplished by the passage of a coolant fluid, such as air, over heat transfer surfaces such as fins projecting from the separator plates.

The "repeating unit" of a fuel cell stack is the smallest recurring portion of the stack which includes at least one membrane electrode assembly, as well as the separator plates and the cooling jacket(s) associated with the membrane electrode assembly. Since one cooling jacket may not be present for each membrane electrode assembly (i.e., a cooling jacket could in some instances provide cooling to multiple membrane electrode assemblies), a repeating unit may include more than one membrane electrode assembly.

Conventional repeating units, which include membrane electrode assemblies interposed between two rigid separator plates generally formed of graphite, are disadvantageous in several respects. First, the separator plates must be formed thick enough to accommodate engraved, milled or molded flow passages. The thickness of the separator plates increases the weight and volume of the fuel cell. Because the reactant flow passages in the present invention are in the electrodes themselves, the separator plates need not accommodate the flow passages, and the separator plates may be formed of thinner material than in conventional assemblies. In the present invention, the separator plates are formed of a thin sheet of electrically conductive material. In one embodiment of the present invention, the electrodes have a flow passage engraved, milled or molded in the surface facing the adjacent separator plate. The electrode surface cooperates with the surface of the separator plate to complete the reactant flow passage. A thin, lightweight, electrically conductive sheet material, such as graphite foil or suitable metal like niobium or titanium for example, may be used as a separator plate. The reduction in the weight and volume of the separator plates in the present invention permits the manufacture of lighter, more compact fuel cells stacks, and provides a higher fuel cell power-to-weight ratio and a higher power-to-volume ratio than in conventional fuel cells. Furthermore, because the separator plates can be made of thinner material, the separator plates in the present invention are less expensive to manufacture than the separator plates in conventional fuel cells.

An additional benefit of the present design is the proximity of the reactant (fuel and oxidant) flow to the catalyst sites. Because the reactants flow through passages in the electrode material itself, as opposed to channels in the separator plate adjacent the electrode, the reactants need not migrate through the entire thickness of the electrode material to reach the catalyst layers. Decreasing the distance through which the reactants must travel to reach the catalyst layer enhances the access of the reactants to the catalyst layer and improves potential fuel cell performance.

Another advantage of the present invention over conventional fuel cell designs is the relative ease of forming flow passages in the electrode material as opposed to engraving, milling or molding passages in the rigid separator plates. Electrodes are generally composed of porous electrically conductive sheet material such as carbon fiber paper, while the rigid separator plates are generally formed of graphite or suitable metal. In the present invention, rigid separator plates need not be engraved, milled or molded, but can be replaced by thin, lightweight sheets of nonporous electrically conductive material, which can be processed using less time and expense than in the milling of graphite or metal separator plates.

SUMMARY OF THE INVENTION

The foregoing advantages are achieved by an electrochemical fuel cell for converting a fuel reactant stream and an oxidant reactant stream to a reaction product stream and electrical energy. The fuel cell comprises first and second separator layers. The separator layers are formed of electrically conductive sheet material which is substantially impermeable to the fuel and oxidant reactant streams. A membrane electrode assembly is interposed between the first and second separator layers. The assembly comprises first and second electrode layers which are formed of porous electrically conductive sheet material. The electrode layers have a catalyst associated therewith, and an ion exchange membrane interposed between the first and second electrode layers. The first electrode layer includes a fuel stream inlet, a fuel stream outlet, and means for flowing the fuel stream within the first electrode layer between the fuel stream inlet and the fuel stream outlet. The second electrode layer includes an oxidant stream inlet, an oxidant stream outlet, and means for flowing the oxidant stream within the second electrode layer between the oxidant stream inlet and the oxidant stream outlet.

In one embodiment, the flow means comprises the interstitial spaces within at least one of the first and second electrode layers. The electrode layers can further comprise dam members for diverting the flow of the reactant stream within the electrode layer. The electrode layers can also comprise capillaries for conducting the reactant stream within the electrode layer along at least a portion of the distance between the inlet and the outlet. Such capillaries can be continuous or discontinuous and have openings at periodic intervals to permit the flow of reactant into the electrode and toward the catalyst layer.

In another embodiment of the electrochemical fuel cell, the electrode layers have at least one groove formed in the surface thereof facing away from the membrane. The surface of the adjacent separator layer facing the electrode layer is substantially planar. The grooved surface of the electrode layer and the planar surface of the adjacent separator layer cooperate to define a passage for the flow of the reactant stream within the electrode layer. In each electrode, the groove can be continuous, interconnecting the reactant inlet and the reactant outlet. The groove can also comprise a first groove extending from the reactant inlet and a second groove extending from the reactant output, the second groove being discontinuous from the first groove. The reactant stream flows from within the first groove to the second groove through the interstitial spaces of the first electrode layer. In the preferred embodiment, the first groove and second groove are branched, the branches of the first groove being interdigitated with the branches of the second groove. The two side walls of the grooves can be coated to render them substantially impermeable to the reactant, such that the flow of reactant is directed toward the catalyst layer through the bottom wall of the grooves to avoid short circuiting of the reactant flow between adjacent grooves or branches.

The electrochemical fuel cell of the present invention preferably further comprises a coolant layer adjacent at least one of the separator layers on the side opposite the membrane electrode assembly. The coolant layer is preferably formed of electrically conductive sheet material to maintain the series electrical connection between the repeating units. The coolant layer comprises means, such as hollow passages, for flowing a coolant fluid within the coolant layer, whereby heat generated by the membrane electrode assembly is absorbed by the coolant. The preferred coolant fluid is air.

The coolant layer can also be formed with at least one groove formed in the surface thereof facing the membrane electrode assembly, where the surface of the adjacent separator layer facing the coolant layer is substantially planar. In such a configuration, the grooved surface of the coolant layer and the planar surface of the adjacent separator layer cooperate to define a passage for the flow of coolant within the coolant layer. The preferred coolant fluid in this configuration is water, but other suitable coolant fluids such as ethylene glycol or air could also be employed.

Cooling of the membrane electrode assembly may also be accomplished by including the means for flowing a coolant fluid within at least one of the electrode layers such that heat generated by the membrane electrode assembly is absorbed by the coolant fluid. The preferred flow means comprises tubes or capillaries for containing the coolant fluid within the membrane electrode assembly. The preferred coolant fluids in this configuration are water and ethylene glycol.

Alternatively, cooling of the membrane electrode assembly may be accomplished by extending heat transfer surfaces or fins from the surfaces of the separator layers facing away from the membrane electrode assembly and flowing a coolant fluid across the heat transfer surfaces. Heat generated by the membrane electrode assembly is conducted across the heat transfer surfaces and absorbed by the coolant fluid. The preferred coolant fluid is air and the preferred means for flowing the coolant across the heat transfer surfaces is a fan.

The electrode layers in the present invention are preferably formed of carbon fiber paper. The separator layers are preferably formed of a graphite composition such as graphite foil, or a suitable metal such as a niobium composition or a titanium composition. The preferred fuel is hydrogen and the preferred oxidant is oxygen. The preferred catalyst comprises platinum or a compound which includes platinum.

DETAILED DESCRIPTION OF THE DRAWINGS

Figure 1:
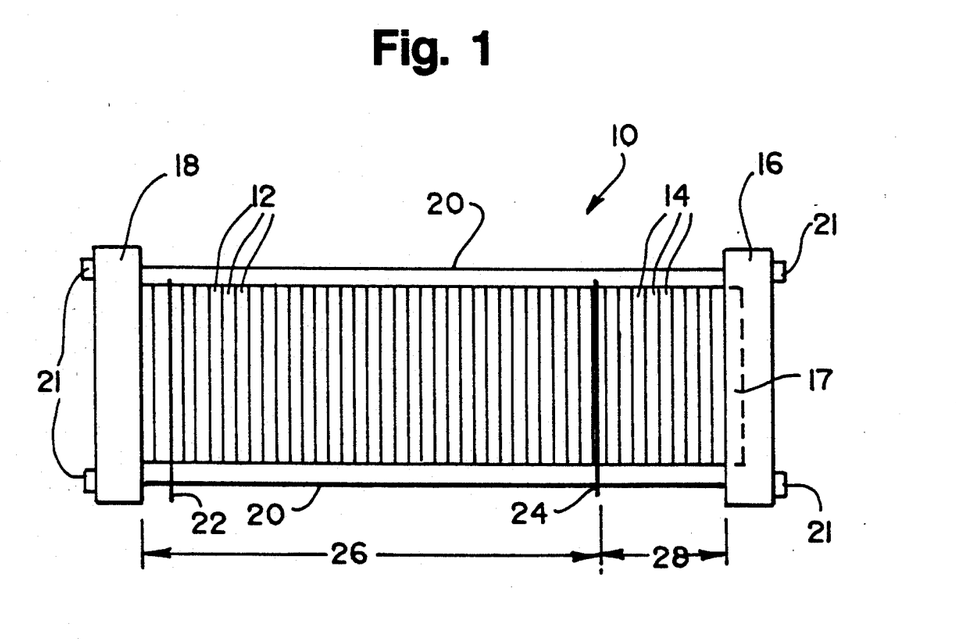
FIG. 1 is a side elevation view of a fuel cell stack showing the electrochemically active and humidification sections.

Turning first to FIG. 1 of the drawings, a fuel cell stack assembly 10 includes an electrochemically active section 26 and a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, to draw current generated by the assembly to a load (not shown). Tie rods 20 extend between end plates 16 and 18 to retain and secure stack assembly 10 in its assembled state with fastening nuts 21.

Active section 26 includes, in addition to bus plates 22 and 24, a plurality of fuel cell repeating units 12. Each repeating unit 12 consists of at least one membrane electrode assembly having integral reactant flow passages, as well as separator layers and a cooling jacket, as described in more detail below. The repeating units 12 are electrically coupled in series by virtue of the contact between the electrically conductive sheets that form the separator layers and cooling jackets.

Humidification section 28 includes a plurality of humidification assemblies 14, each assembly 14 consisting of fuel or oxidant reactant flow field plate, a water flow field plate, and a water vapor transport membrane interposed between the reactant flow field plate and the water flow field plate. Humidification section 28 imparts water vapor to the fuel and oxidant streams fed to active section 26, thereby preventing the membranes within the active section from drying out.

Figure 2:
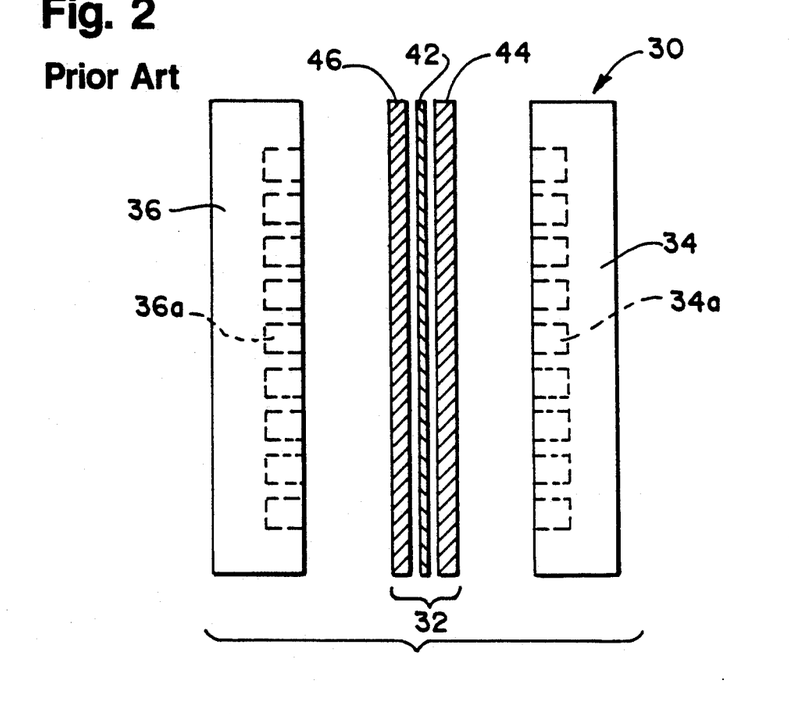
FIG. 2 is an exploded side view of a conventional (prior art) membrane electrode assembly interposed between two rigid separator plates having reactant flow field grooves formed in the surfaces facing the electrodes.

FIG. 2 illustrates a conventional, prior art fuel cell 30. Fuel cell 30 includes membrane electrode assembly 32 interposed between rigid separator plates 34 and 36. Membrane electrode assembly 32 consists of an ion exchange membrane 42 interposed between two electrodes, namely, anode 44 and cathode 46. In conventional fuel cells, anode 44 and cathode 46 are formed of porous electrically conductive sheet material, preferably carbon fiber paper, and have planar surfaces. Electrodes 44 and 46 have a thin layer of catalyst material disposed on their surfaces at the interface with membrane 42 to render them electrochemically active.

As shown in FIG. 2, separator plate 34 has at least one groove 34a engraved, milled or molded in its surface facing membrane electrode assembly 32. Similarly, separator plate 36 has at least one groove 36a engraved, milled or molded in its surface facing membrane electrode assembly 32. When assembled against the cooperating surfaces of electrodes 44 and 46, grooves 34a and 36a define the reactant flow field passages for the fuel and oxidant, respectively. Grooves 34a and 36a are each preferably a single continuous groove interconnecting the inlet and outlet manifolds (not shown) for the fuel and oxidant supplied to fuel cell 30, as described in U.S. Pat. No. 4,988,583, incorporated herein by reference. Grooves 34a and 36a could also be engraved, milled or molded as a plurality of separate grooves interconnecting the respective fuel or oxidant inlet and outlet manifolds.

Figure 3:
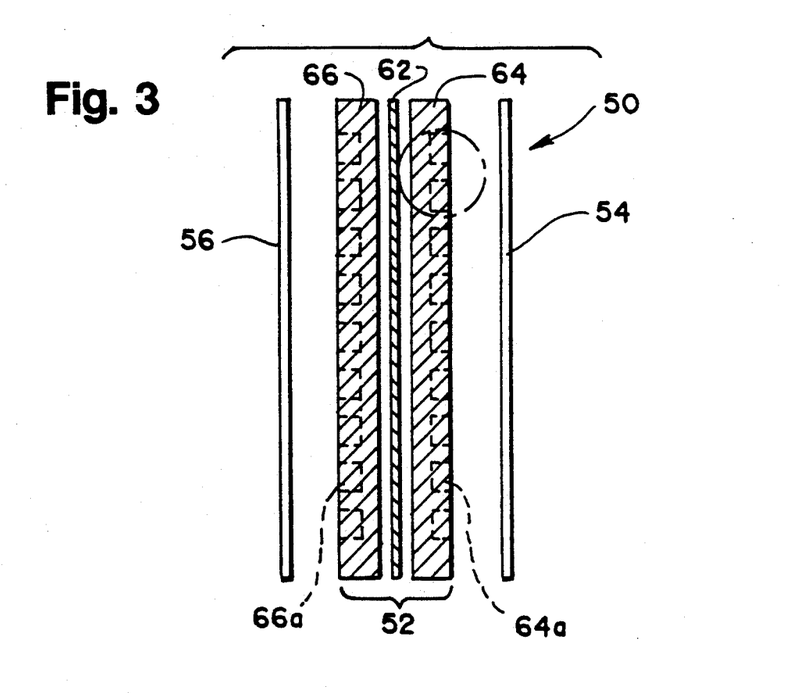
FIG. 3 is an exploded side view of a lightweight fuel cell membrane electrode assembly having integral reactant flow passages according to the present invention and interposed between two separator layers.

Turning now to FIG. 3, a fuel cell 50 employs a membrane electrode assembly 52 having integral reactant flow passages. Membrane electrode assembly 52 is interposed between lightweight separator layers 54 and 56. Membrane electrode assembly 52 consists of an ion exchange membrane 62 interposed between two electrodes, namely, anode 64 and cathode 66. Anode 64 and cathode 66 are formed of porous electrically conductive sheet material, preferably carbon fiber paper. Electrodes 64 and 66 have a thin layer of catalyst material disposed on their surfaces at the interface with membrane 62 to render them electrochemically active.

As shown in FIG. 3, anode 64 has at least one optional groove 64a formed in its surface facing away from membrane 62. Similarly, cathode 66 has at least one optional groove 66a formed in its surface facing away from membrane 62. When assembled against the cooperating surfaces of separator layers 54 and 56, grooves 64a and 66a define the reactant flow field passages for the fuel and oxidant, respectively. Grooves 64a and 66a may be configured as a single continuous groove or a plurality of separate grooves interconnecting the inlet and outlet manifolds, as discussed above with respect to the grooves formed in separator plates of conventional fuel cells. Alternatively, grooves 64a and 66a may be omitted entirely from electrodes 64 and 66, with the pores or interstitial spaces within electrodes 64 and 66 serving as the reactant flow passages for the fuel and oxidant streams, as well as for the removal of reaction product.

Figure 3A:
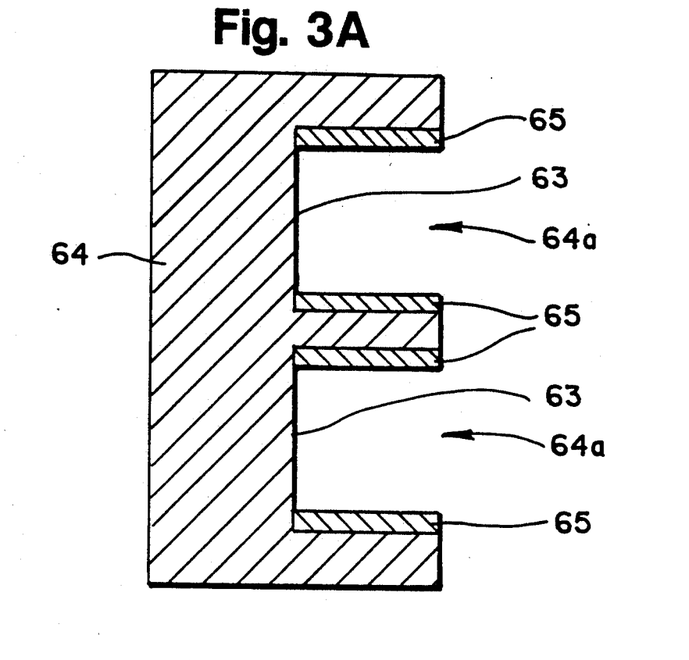
FIG. 3A is an enlarged sectional view of the circled portion of the electrode of FIG. 3, having reactant flow grooves with coated side walls.

FIG. 3A is an enlarged sectional view of the circled portion of the electrode 64 of FIG. 3, in which the two side walls of reactant flow grooves 64a are coated with a sealant layer 65 that is substantially impermeable to the reactant flowing through grooves 64a. The presence of sealant layer 65 directs the flow of reactant toward the catalyst layer (not shown in FIG. 3A) through the bottom wall 63 of grooves 64a to avoid the short circuiting of the reactant flow between adjacent grooves.

Figure 3B:
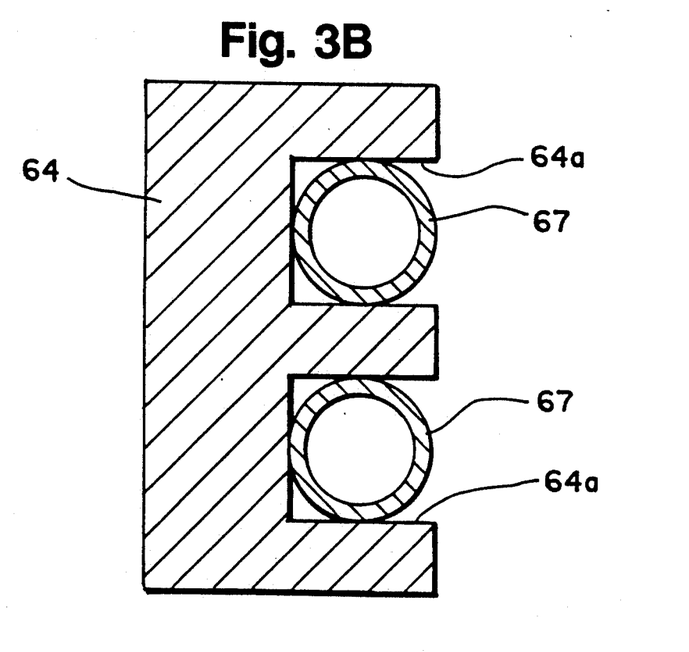
FIG. 3B is an enlarged sectional view of the circled portion of the electrode of FIG. 3, having reactant flow grooves with capillaries extending through the grooves.

FIG. 3B is an enlarged sectional view of the circled portion of the electrode 64 of FIG. 3, in which capillaries 67 for carrying reactant extend within grooves 64a. Capillaries 67 contain openings (not shown) formed along their length at periodic intervals to permit the flow of reactant into electrode 64 and toward the catalyst layer (not shown) at which the electrochemical reaction occurs. Capillaries 67 can be continuous (i.e., extending the entire length of the groove between the inlet and the outlet) or discontinuous (i.e., extending along only a portion of the groove), depending upon the efficiency of reactant flow through the electrode.

Figure 4:
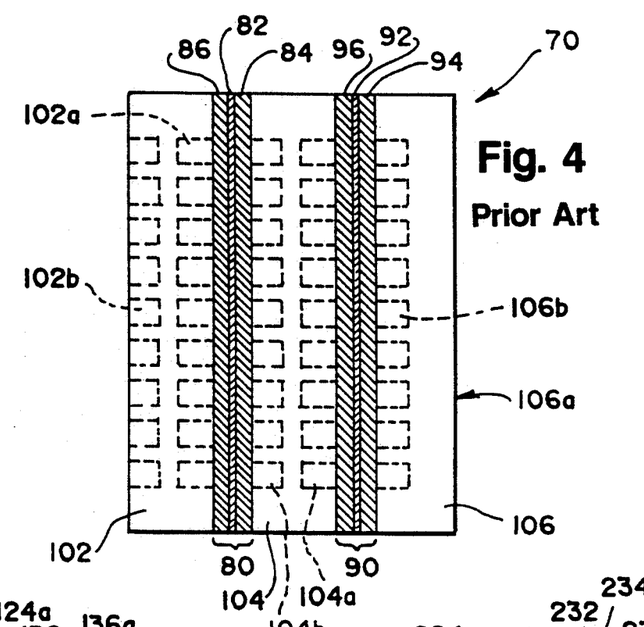
FIG. 4 is a side view of a conventional (prior art) fuel cell repeating unit consisting of two membrane electrode assemblies and interposed between rigid separator plates, one of which contains coolant passages.

FIG. 4 illustrates a conventional fuel cell repeating unit 70 consisting of two membrane electrode assemblies 80, 90. MEA 80 is substantially identical in configuration to membrane electrode assembly 32 of FIG. 2, and includes an ion exchange membrane 82 interposed between anode 84 and cathode 86. Similarly, MEA 90 is identical in configuration to MEA 32 of FIG. 2, and includes an ion exchange membrane 92 interposed between anode 94 and cathode 96. Anodes 84, 94 and cathodes 86, 96 are formed from porous electrically conductive sheet material. In conventional fuel cell repeating unit 70, MEA 80 is interposed between rigid separator plates 102 and 104, while MEA 90 is interposed between separator plates 104 and 106. Separator plate 102 has grooves 102a and 102b engraved, milled or molded in its principal surfaces, as shown in FIG. 4. Plate 104 has grooves 104a and 104b engraved, milled or molded in its principal surfaces. Plate 106 has one set of grooves 106b engraved, milled or molded in one principal surface, as shown; the other principal surface 160a is blank.

When fuel cell 70 is assembled as shown in FIG. 4, the surface of MEA 80 cooperates with grooves 102a to define the reactant flow passage for carrying the oxidant stream along the principal surface of cathode 86, and for other surface of MEA 80 cooperates with grooves 104b to define the reactant flow passage for carrying the fuel stream along the principal surface of anode 84. Similarly, the surface of MEA 90 cooperates with grooves 104a to define the reactant flow passage for carrying the oxidant stream along the principal surface of cathode 96, and for the removal of reaction product formed at cathode 96. The other surface of MEA 90 cooperates with grooves 106b to define the reactant flow passage for carrying the fuel stream along the principal surface of anode 94. The blank surface 160a of plate 106 cooperates with grooves 102b in the adjacent fuel cell repeating unit (not shown) to form the passage for carrying the coolant stream. As such, plate 102 is also referred to as the cooling jacket.

Figure 5:
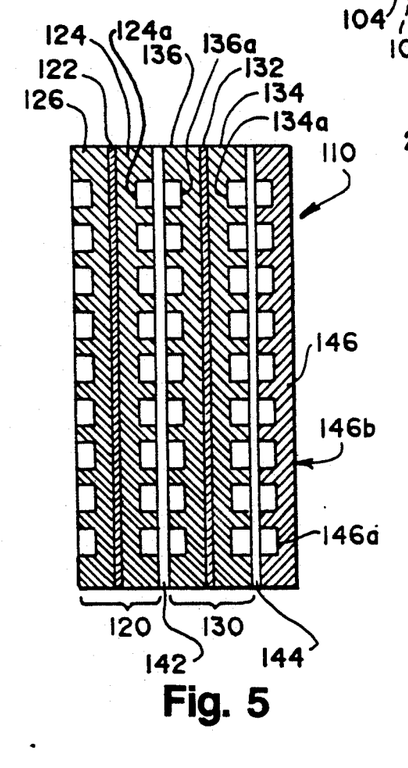
FIG. 5 is a side view of one embodiment of a fuel cell repeating unit consisting of two membrane electrode assemblies having integral reactant flow passages according to the present invention and interposed between two thin, lightweight separator layers, and a single-sided cooling jacket.

FIG. 5 illustrates a first embodiment of a fuel cell repeating unit 110 consisting of two membrane electrode assemblies 120, 130 having integral reactant flow passages according to the present invention and interposed between two thin, lightweight separator layers 142, 144 and a single-sided cooling jacket 146. MEA 120 is substantially identical in configuration to MEA 52 of FIG. 3, and includes an ion exchange membrane 122 interposed between anode 124 and cathode 126. Similarly, MEA 130 is identical in configuration to MEA 52 of FIG. 3, and includes an ion exchange membrane 132 interposed between anode 134 and cathode 136. Anodes 124, 134 and cathodes 126, 136 are formed from porous electrically conductive sheet material. In repeating unit 110, MEA 120 is interposed between thin, lightweight separator layer 142 and the blank surface of the cooling jacket of the adjacent repeating unit (not shown). MEA 130 is interposed between thin, lightweight separator layers 142 and 144. Anode 124 has grooves 124a milled in its principal surface facing away from membrane 122, as shown in FIG. 5, while cathode 126 has grooves 126a milled in its principal surface facing away from membrane 122. Similarly, anode 134 has grooves 134a milled in its principal surface facing away from membrane 132 and cathode 136 has grooves 136a milled in its principal surface facing away from membrane 132. Cooling jacket 146 has one set of grooves 146a engraved, milled or molded in one principal surface, as shown; the other principal surface 146b is blank.

When repeating unit 110 is assembled as shown in FIG. 5, the surface of thin, lightweight separator layer 142 cooperates with grooves 124a to define the reactant flow passage for carrying the fuel stream within anode 124. On its opposite surface, separator layer 142 cooperates with grooves 136a to define the reactant flow passages for carrying the oxidant stream within cathode 136, and for removing reaction product formed at cathode 136. The surface of thin, lightweight separator layer 144 cooperates with grooves 134a to define the reactant flow passage for carrying the fuel stream within anode 134. On its opposite side, separator layer 144 cooperates with grooves 146a to form the passage for carrying the coolant fluid within single-sided coolant jacket 146. The opposite surface 146b of coolant jacket 146 is blank (ungrooved), and cooperates with grooves 126a in the cathode 126 of the adjacent fuel cell repeating unit (not shown) to define the reactant flow passages for carrying the oxidant stream within cathode 126.

Figure 6:
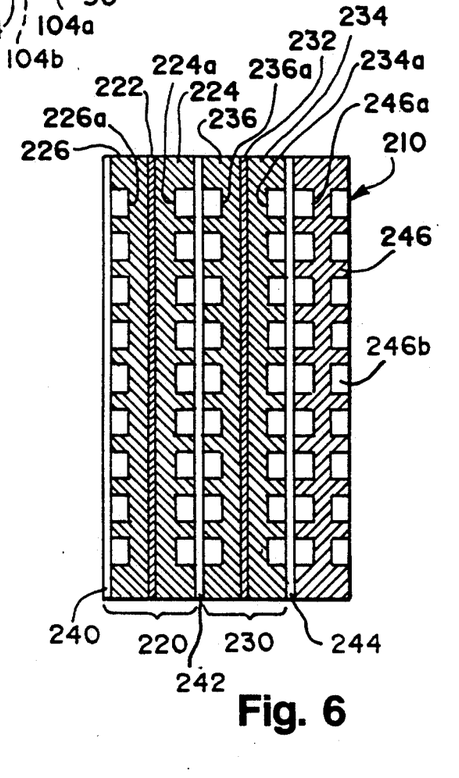
FIG. 6 is a side view of another embodiment of a fuel cell repeating unit consisting of two membrane electrode assemblies having integral reactant flow passages according to the present invention and interposed between three thin, lightweight separator layers, and a double-sided cooling jacket.

FIG. 6 illustrates a second embodiment of a fuel cell repeating unit 210 consisting of two membrane electrode assemblies 220, 230 having integral reactant flow passages according to the present invention and interposed between three thin, lightweight separator layers 240, 242, 244 and a double-sided cooling jacket 246. MEA 220 is substantially identical to MEA 120 of FIG. 5, and includes an ion exchange membrane 222 interposed between an anode 224 having integral grooves 224a formed therein and a cathode 226 having integral grooves 226a formed therein. Similarly, MEA 230 is substantially identical to MEA 130 of FIG. 5, and includes an ion exchange membrane 232 interposed between an anode 234 having integral grooves 234a formed therein and a cathode 236 having integral grooves 236a formed therein. MEA 220 is interposed between thin separator layers 240 and 242, while MEA 230 is interposed between separator layers 242 and 244. Separator layer 240 cooperates with grooves 226a to define a reactant flow passage for carrying the oxidant stream within cathode 226, as well as for the removal of reaction product formed at cathode 226. As shown in FIG. 6, one surface of separator layer 242 cooperates with grooves 224a to define the reactant flow passage for carrying the fuel stream within anode 224. The other surface of separator layer 242 cooperates with grooves 236a to define the passage for carrying the oxidant stream within cathode 236, as well as for the removal of reaction product formed at cathode 236. Separator layer 244 cooperates with grooves 234a to define the passage for carrying the fuel stream within anode 234. On its opposite side, separator layer 244 cooperates with grooves 246a to form a passage for carrying a coolant stream within double-sided cooling jacket 246. Separator layer 240 of the adjacent repeating unit (not shown) cooperates with grooves 246b of coolant jacket 246 to form the passages for carrying an additional coolant stream within coolant jacket 246.

Figures 7, 7A, 8, 8A:
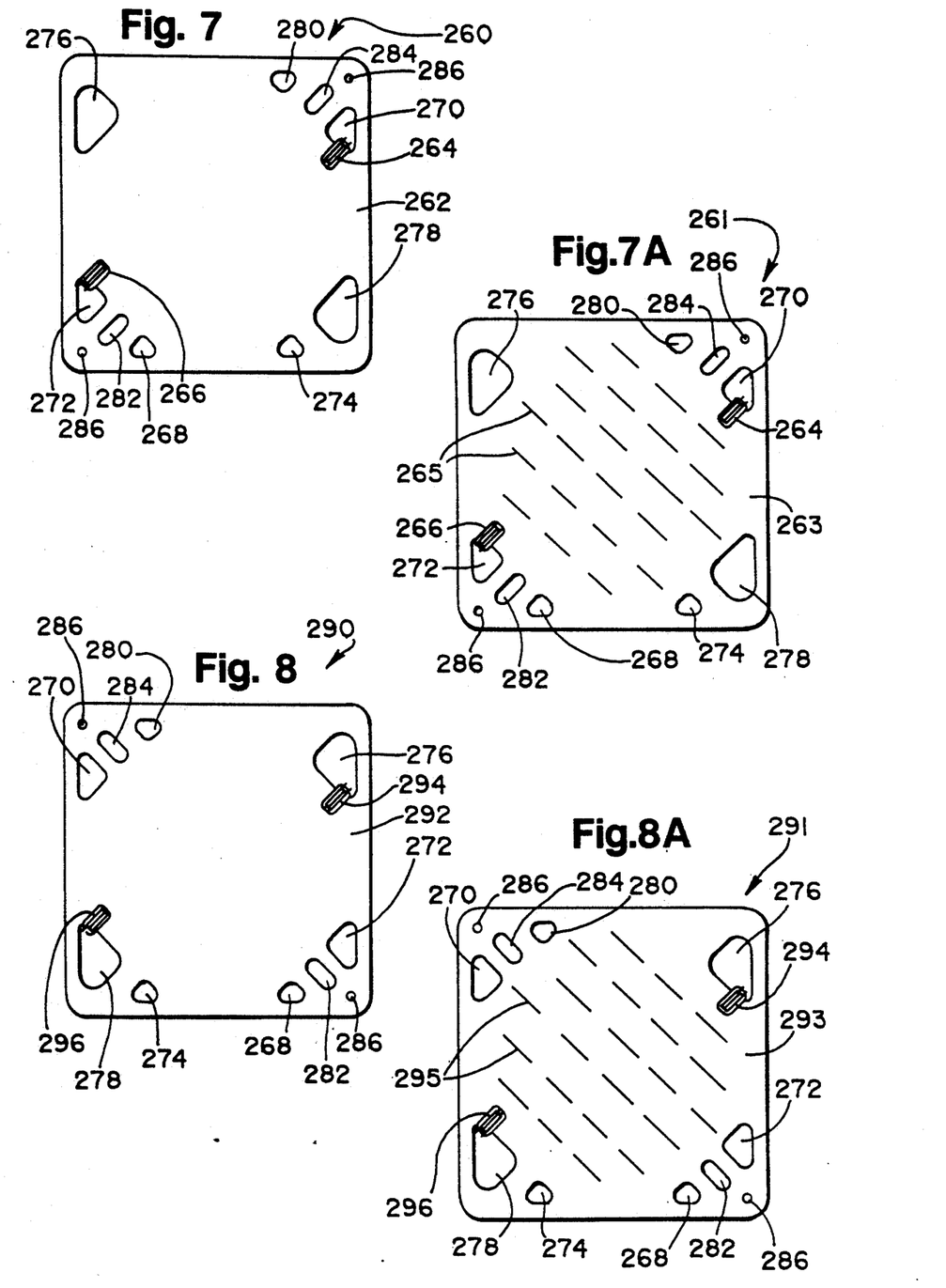
FIG. 7 is a plan view of one embodiment of an anode according to the present invention and formed of porous electrically conductive sheet material and having an inlet and an outlet associated with the respective fuel inlet and outlet manifolds.
FIG. 7A is a plan view of the anode embodiment of FIG. 7 with dam members within the porous electrically conductive sheet material for dispersing the flow of fuel between the inlet and the outlet.
FIG. 8 is a plan view of an embodiment of a cathode corresponding to the anode of FIG. 7 and formed of porous electrically conductive sheet material and having an inlet and an outlet associated with the respective oxidant inlet and outlet manifolds.
FIG. 8A is a plan view of the cathode embodiment of FIG. 8 with dam members within the porous electrically conductive sheet material for dispersing the flow of oxidant between the inlet and the outlet.

FIG. 7 shows a first embodiment of an anode 260 having integral reactant flow passages for the fuel (hydrogen) stream. Anode 260 is formed of porous electrically conductive sheet material 262 having a plurality of openings formed therein. The openings align with corresponding openings in adjoining electrodes and separator layers to form the manifolds for carrying the hydrogen, oxidant (oxygen-containing air) and coolant (water) streams within the fuel cell stack. The openings in anode 260 include dry (unhumidified) hydrogen inlet manifold 268, humidified hydrogen inlet manifold 270, humidified hydrogen outlet manifold 272, dry (unhumidified) air inlet manifold 274, humidified air inlet manifold 276, and humidified air outlet manifold 278, water inlet manifold 280, water-to-humidifier manifold 282, and water outlet manifold 284. Locator or alignment pin openings 286 are also formed in anode 260, as shown in FIG. 7. Humidified hydrogen inlet manifold 270 has an inlet runner 264 for conducting the hydrogen fuel stream from manifold 270 to within the interstices of anode sheet material 262. Similarly, humidified hydrogen outlet manifold 272 has an outlet runner 266 for conducting the fuel stream from within the interstices of anode sheet material 262 to within humidified hydrogen outlet manifold 272. The hydrogen fuel stream flows within the interstitial spaces of porous sheet material 262 between inlet runner 264 and outlet runner 266.

FIG. 7A shows the anode of FIG. 7 with dam members 265 disposed within the porous electrically conductive sheet material 263. Dam members 265 disperse the flow of fuel between the inlet runner 264 and the outlet runner 266, so that the fuel uniformly permeates and reaches the outer regions of sheet material 263, as opposed to being confined to preferential flow channels around the line connecting inlet 264 and outlet 266.

FIG. 8 shows the embodiment of a cathode 290 corresponding to the anode 260 of FIG. 7. Cathode 290 is formed of porous electrically conductive sheet material 292 having a plurality of openings corresponding to the openings described above for anode 260. Humidified air inlet manifold 276 has an inlet runner 294 for conducting the humidified oxygen-containing air stream from manifold 276 to within the interstices of cathode sheet material 292. Similarly, humidified air outlet manifold 278 has an outlet runner 296 for conducting the humidified air stream from within the interstices of cathode sheet material 292 to within air outlet manifold 278. The humidified oxygen-containing air stream flows within the interstitial spaces of porous sheet material 292 between inlet runner 294 and outlet runner 296.

FIG. 8A shows the cathode of FIG. 8 with dam members 295 disposed within the porous electrically conductive sheet material 293. Dam members 295 disperse the flow of oxidant between the inlet runner 294 and the outlet runner 296, so that the oxidant uniformly permeates and reaches the outer regions of sheet material 293, as opposed to being confined to preferential flow channels around the line connecting inlet 294 and outlet 296.

Figures 9, 10, 11, 12:
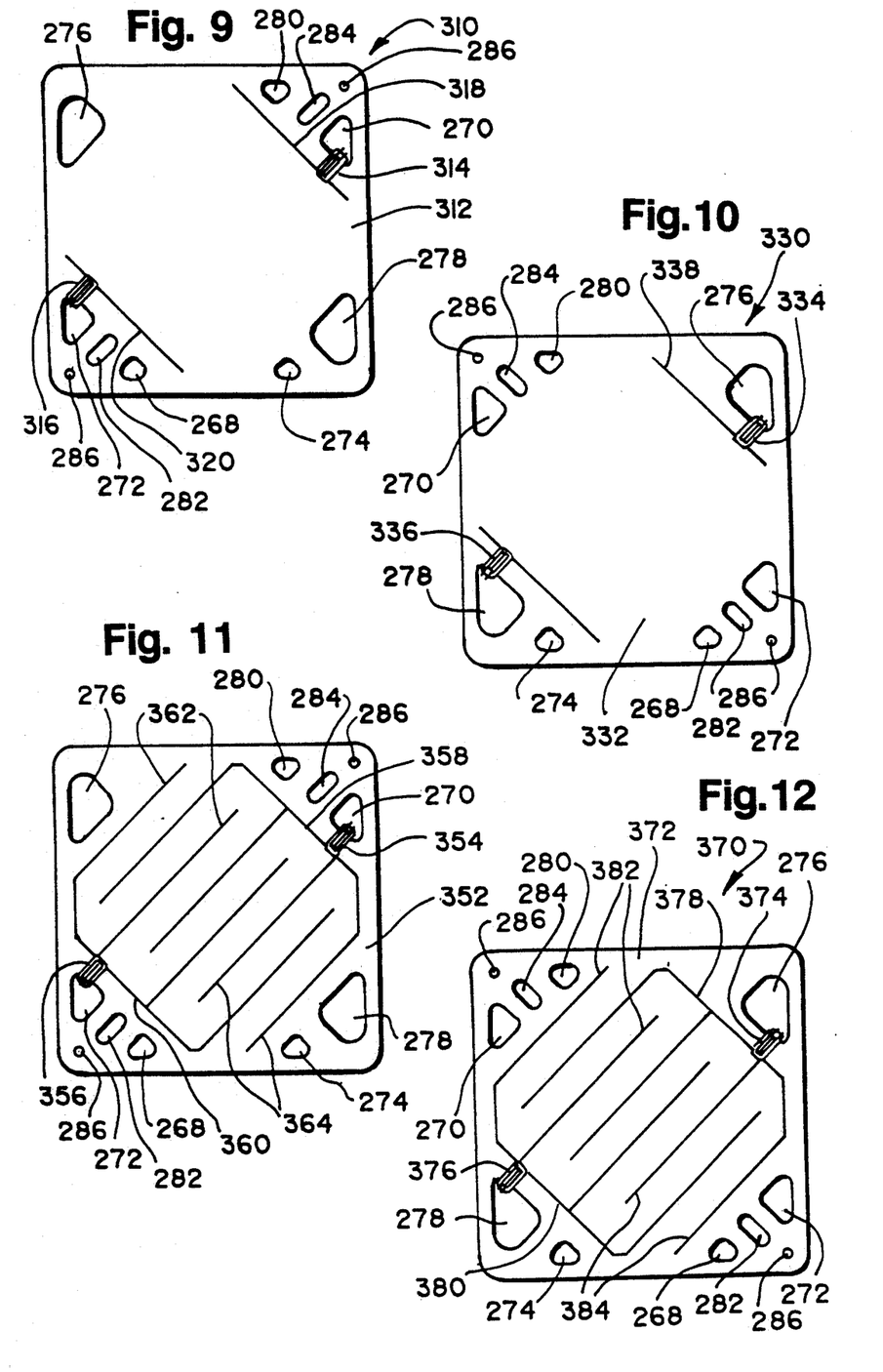
FIG. 9 is a plan view of a second embodiment of an anode according to the present invention and formed of porous electrically conductive sheet material and having header grooves extending from the inlet and outlet associated with the respective fuel inlet and outlet manifolds.
FIG. 10 is a plan view of a second embodiment of a cathode corresponding to the anode of FIG. 9 and formed of porous electrically conductive sheet material and having header grooves extending from the inlet and outlet associated with the respective oxidant inlet and outlet manifolds.
FIG. 11 is a plan view of a third embodiment of an anode according to the present invention and formed of porous electrically conductive sheet material and having branched, interdigitated grooves extending from the inlet and outlet associated with the respective fuel inlet and outlet manifolds.
FIG. 12 is a plan view of a third embodiment of a cathode corresponding to the anode of FIG. 11 and formed of porous electrically conductive sheet material and having branched, interdigitated grooves extending from the inlet and outlet associated with the respective oxidant inlet and outlet manifolds.

FIG. 9 shows a second embodiment of an anode 310 having integral reactant flow passages for the fuel (hydrogen) stream. Like anode 260, anode 310 is formed of porous electrically conductive sheet material 312 having a plurality of openings corresponding to the openings described above for anode 260 in FIG. 7. Humidified hydrogen inlet manifold 270 has an inlet runner 314 and a header groove 318 extending from inlet runner 314 for conducting the hydrogen fuel stream from manifold 270 to within the interstices of anode sheet material 312. Humidified hydrogen outlet manifold 272 has an outlet runner 316 and a header groove 320 extending from outlet runner 316 for conducting the fuel stream from within the interstices of anode sheet material 312 to within humidified hydrogen outlet manifold 272. The hydrogen fuel stream flows between header grooves 318 and 320 within the interstitial spaces of porous sheet material 262.

FIG. 10 shows the embodiment of a cathode 330 corresponding to the anode 310 of FIG. 9. Cathode 330 is formed of porous electrically conductive sheet material 332 having a plurality of openings corresponding to the openings described above for anode 260. Humidified air inlet manifold 276 has an inlet runner 334 and a header groove 338 extending from inlet runner 334 for conducting the humidified oxygen-containing air stream from manifold 276 to within the interstices of cathode sheet material 332. Similarly, humidified air outlet manifold 278 has an outlet runner 336 and a header groove 340 for conducting the humidified air stream from within the interstices of cathode sheet material 332 to within air outlet manifold 278. The humidified oxygen-containing air stream flows within the interstitial spaces of porous sheet material 332 between header groves 338 and 340.

FIG. 11 shows a third embodiment of an anode 350 having integral reactant flow passages for the fuel (hydrogen) stream. Anode 350 is formed of porous electrically conductive sheet material 352 having a plurality of openings corresponding to the openings described above for anode 260 in FIG. 7. Humidified hydrogen inlet manifold 270 has an inlet runner 354, a header groove 358 extending from inlet runner 354, and branch grooves 364 extending from header groove 358 for conducting the hydrogen fuel stream from manifold 270 to within the interstices of anode sheet material 352. Humidified hydrogen outlet manifold 272 has an outlet runner 356, a header groove 360, and branch grooves 362 extending from header groove 360 for conducting the fuel stream from within the interstices of anode sheet material 352 to within humidified hydrogen outlet manifold 272. Branch grooves 362 are interdigitated with branch grooves 364, as shown in FIG. 11. The hydrogen fuel stream flows between the individual branch grooves 362 and 364, and also between the header grooves and the neighboring branch grooves, within the interstitial spaces of porous sheet material 352.

FIG. 12 shows the embodiment of a cathode 370 corresponding to the anode 350 of FIG. 11. Cathode 370 is formed of porous electrically conductive sheet material 372 having a plurality of openings corresponding to the openings described above for anode 260. Humidified air inlet manifold 276 has an inlet runner 374, a header groove 378, and branch grooves 384 extending from header groove 378 for conducting the humidified oxygen-containing air stream from manifold 276 to within the interstices of cathode sheet material 372. Humidified air outlet manifold 278 has an outlet runner 376, a header groove 380, and branch grooves 382 extending from header groove 380 for conducting the humidified air stream from within the interstices of cathode sheet material 372 to within air outlet manifold 278. Branch grooves 382 are interdigitated with branch grooves 384, as shown in FIG. 12. The humidified oxygen-containing air stream flows between individual branch grooves 382 and 384, and also between the header grooves and the neighboring branch grooves, within the interstitial spaces of porous sheet material 372.

Figure 13:
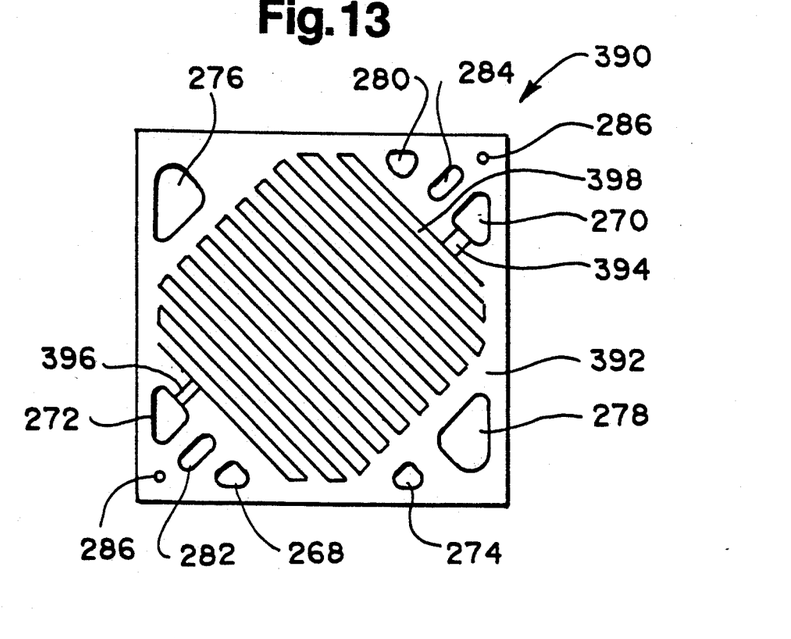
FIG. 13 is a plan view of a fourth embodiment of an anode according to the present invention and formed of porous electrically conductive sheet material and having a single, serpentine groove interconnecting the inlet and outlet associated with the respective fuel inlet and outlet manifolds.

FIG. 13 shows a fourth embodiment of an anode 390 having integral reactant flow passages for the fuel (hydrogen) stream. Anode 390 is formed of porous electrically conductive sheet material 392 having a plurality of openings corresponding to the openings described above for anode 260 in FIG. 7. Humidified hydrogen inlet manifold 270 has an inlet runner 394 extending therefrom, as shown in FIG. 13. Humidified hydrogen outlet manifold 272 has an outlet runner 396 extending therefrom, as shown. A single, continuous serpentine groove 398 interconnects inlet runner 394 and outlet runner 396, and conducts the hydrogen fuel stream from inlet runner 394 to outlet runner 396.

Figure 14:
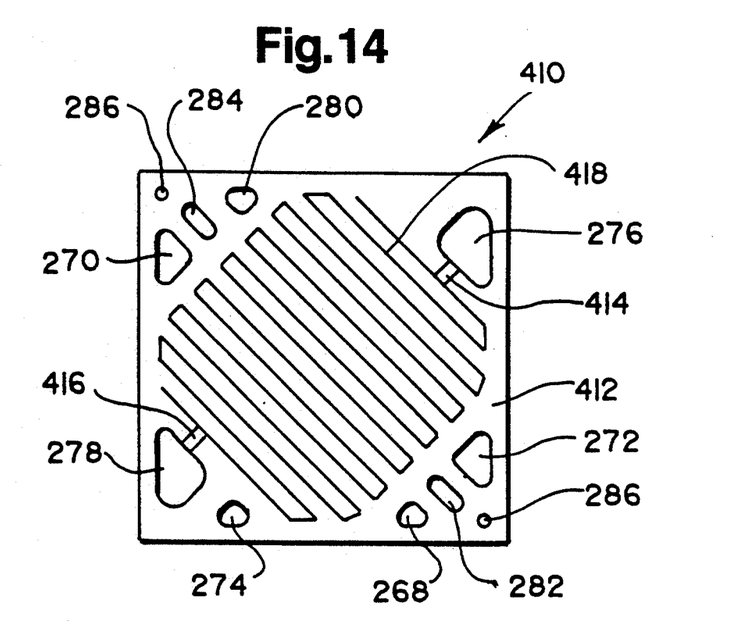
FIG. 14 is a plan view of a fourth embodiment of a cathode corresponding to the anode of FIG. 13 and formed of porous electrically conductive sheet material and having a single, serpentine groove interconnecting the inlet and outlet associated with the respective oxidant inlet and outlet manifolds.

FIG. 14 shows the embodiment of a cathode 410 corresponding to the anode 390 of FIG. 13. Cathode 410 is formed of porous electrically conductive sheet material 412 having a plurality of openings corresponding to the openings described above for anode 260. Humidified air inlet manifold 276 has an inlet runner 414 extending therefrom, as shown in FIG. 14. Humidified air outlet manifold 278 has an outlet runner 416 extending therefrom, as shown. A single, continuous serpentine groove 418 interconnects inlet runner 414 and outlet runner 416, and conducts the oxygen-containing air stream from inlet runner 414 to outlet runner 416.

Figure 15:
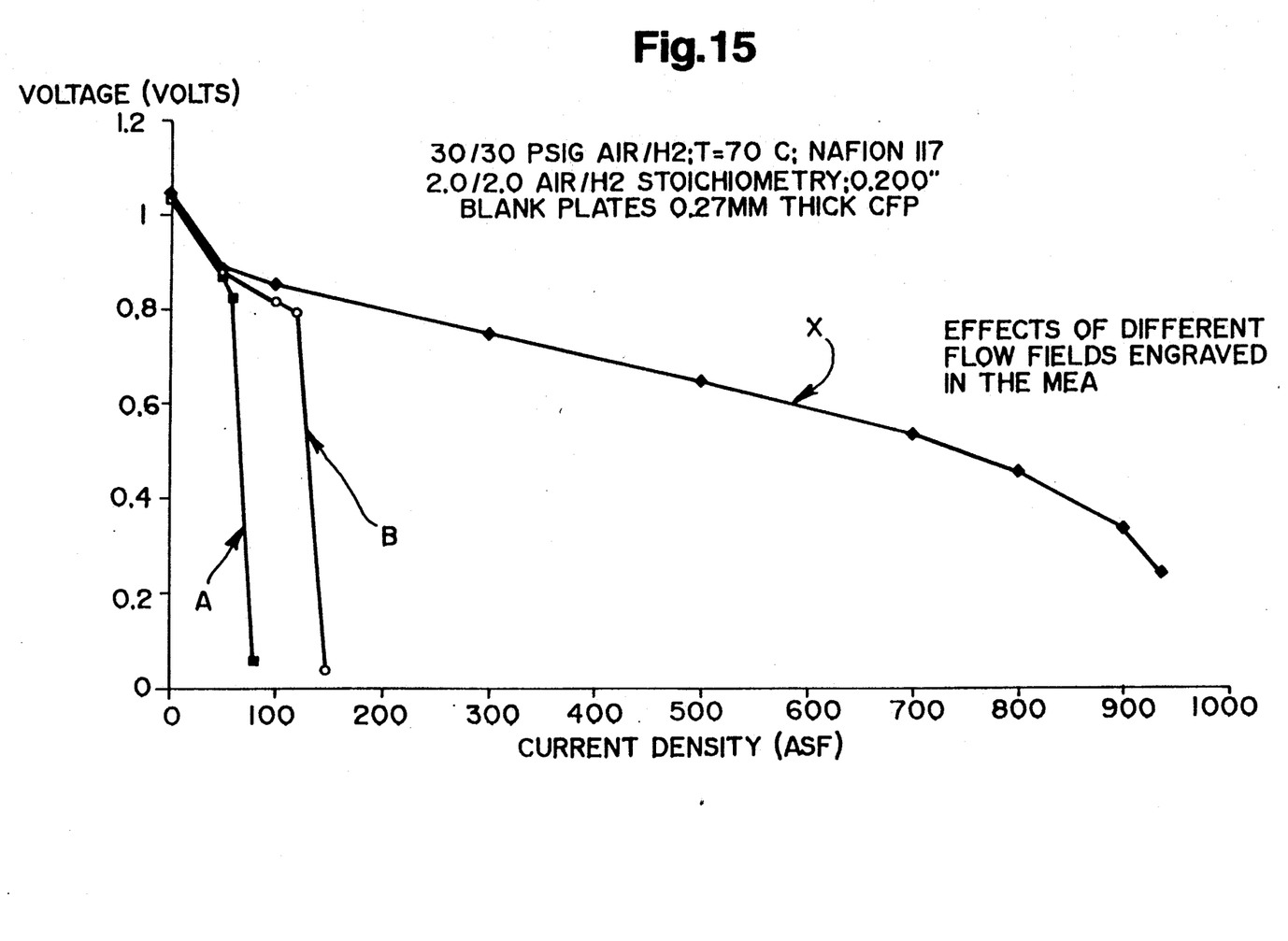
FIG. 15 is a composite of three polarization plots of cell voltage as a function of current density in a unit cell employing (1) electrodes having integral reactant flow passages as shown in FIGS. 9 and 10 (plot labeled "A"), (2) electrodes having integral reactant flow passages as shown in FIGS. 11 and 12 (plot labeled "B"), and (3) conventional (ungrooved) electrodes and graphite flow field plates having single pass, continuous flow channels similar to those shown in FIGS. 13 and 14 (plot labeled "X").

FIG. 15 compares the performance of two individual fuel cells employing membrane electrode assemblies having different integral reactant flow passage configurations to the performance of a fuel cell employing a membrane electrode assembly having conventional (ungrooved) electrodes and graphite flow field plates having single pass, continuous flow channels similar to those shown in FIGS. 13 and 14. The fuel cells of FIG. 15 employed a Nafion 117 (0.007 inch thick) ion exchange membrane, and were operated at a pressure of 30/30 psig air/hydrogen, a temperature of 70° C., and an air/hydrogen stoichiometry of 2.0/2.0. The fuel cells of FIG. 15 also employed graphite separator layers having a thickness of 0.20 inches. The electrodes were formed from 0.27 inch thick carbon fiber paper. Each of the fuel cells was interposed between two single-sided graphite cooling jackets.

The plot labeled "A" in FIG. 15 shows voltage as a function of current density (in amps per square foot) for the electrode configuration of FIGS. 9 and 10, namely, with the anode and cathode both having gas inlets and header grooves formed their surfaces facing away from the membrane. The plot labeled "B" in FIG. 15 shows voltage as a function of current density (in amps per square foot) for the electrode configuration of FIGS. 11 and 12, namely the branched, interdigitated grooves formed in their surfaces facing away from the membrane. In plots "A" and "B", cell voltage decreases slightly from about 1.0 volt to about 0.9 volt as current density is increased. In plot "A", voltage decreases sharply to approximately zero as current density is increased beyond 60 amps per square foot. The interdigitated groove configuration of plot "B" maintains a higher voltage level over a broader current density range than the configuration of plot "A", exhibiting a sharp voltage decrease to approximately zero at current densities beyond 120 amps per square foot. The conventional configuration of plot "X", with the reactant flow channels formed in the graphite plates, maintained higher voltage levels over a broader current density range than either of the plot "A" or plot "B" configurations.

Figure 16:
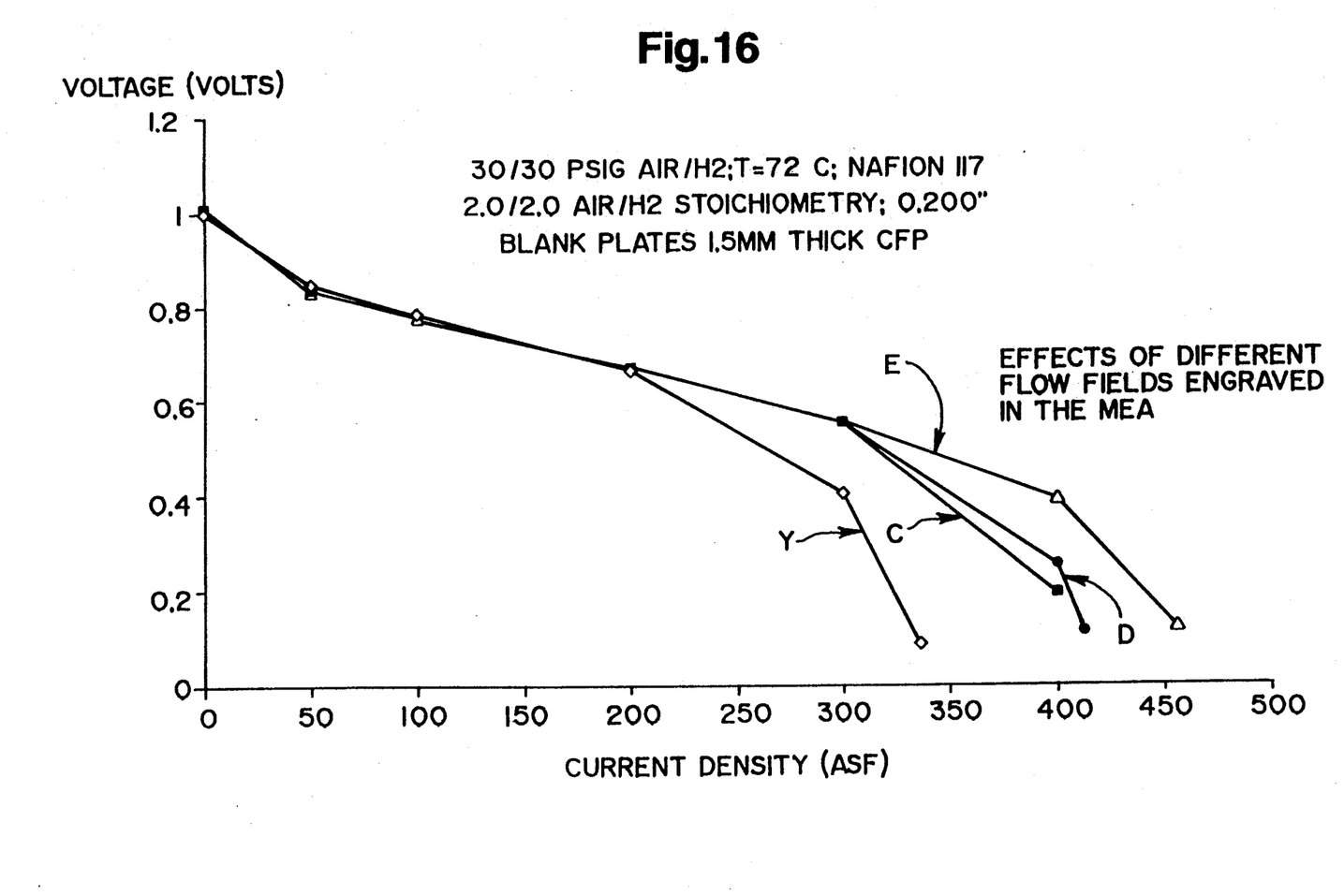
FIG. 16 is a composite of four polarization plots of cell voltage as a function of current density in a unit cell employing (1) electrodes having integral reactant flow passages as shown in FIGS. 7 and 8 (plot labeled "C"); (2) electrodes having integral reactant flow passages as shown in FIGS. 9 and 10 (plot labeled "E"); (3) electrodes having integral reactant flow passages as shown in FIGS. 13 and 14 (plot labeled "D"); and (4) conventional (ungrooved) electrodes and graphite flow field plates having single pass, continuous flow channels similar to those shown in FIGS. 13 and 14 (plot labeled "Y").

FIG. 16 compares the performance of three individual fuel cells employing membrane electrode assemblies having different integral reactant flow passage configurations to the performance of a fuel cell employing a membrane electrode assembly having conventional (ungrooved) electrodes and graphite flow field plates having single pass, continuous flow channels similar to those shown in FIGS. 13 and 14. The fuel cells employed a Nafion 117 (0.007 inch thick) ion exchange membrane, and were operated at a pressure of 30/30 psig air/hydrogen, a temperature of 72° C., and an air/hydrogen stoichiometry of 2.0/2.0. The fuel cells of FIG. 16 also employed graphite separator layers having a thickness of 0.20 inches. The electrodes were formed from 1.5 millimeter thick carbon fiber paper. Each of the fuel cells was interposed between two single-sided graphite cooling jackets.

The plot labeled "C" in FIG. 16 shows voltage as a function of current density (in amps per square foot) for the electrode configuration of FIGS. 7 and 8, namely, with the anode and cathode having gas inlets and outlets extending from the respective manifolds to the interstices of the electrode material. The plot labeled "D" in FIG. 16 shows voltage as a function of current density (in amps per square foot) for the electrode configuration of FIGS. 13 and 14, namely the anode and cathode having a single, continuous serpentine groove interconnecting the inlets and the outlets. The plot labeled "E" in FIG. 16 shows voltage as a function of current density (in amps per square foot) for the electrode configuration of FIGS. 9 and 10, namely, with the anode and cathode both having gas inlets and header grooves formed their surfaces facing away from the membrane. In plots "C", "D" and "E", cell voltage decreases substantially linearly from about 1.0 volt to about 0.6 volt as current density is increased to about 300 amps per square foot. In plots "C" and "D", voltage decreases sharply to approximately 0.2 volts as current density is increased beyond 300 amps per square foot. In plot "E", voltage decreases sharply to approximately 0.2 volts as current density is increased beyond 400 amps per square foot. The gas inlet and header configuration of plot "E" thus maintains a higher voltage level over a broader current density range than the gas inlet only and single groove configurations of plots "C" and "D". The configurations of plots "C", "D" and "E" each maintained higher voltage levels over a broader current density range than the conventional configuration of plot "Y", with the reactant flow channels formed in the graphite plates.

Figure 17:
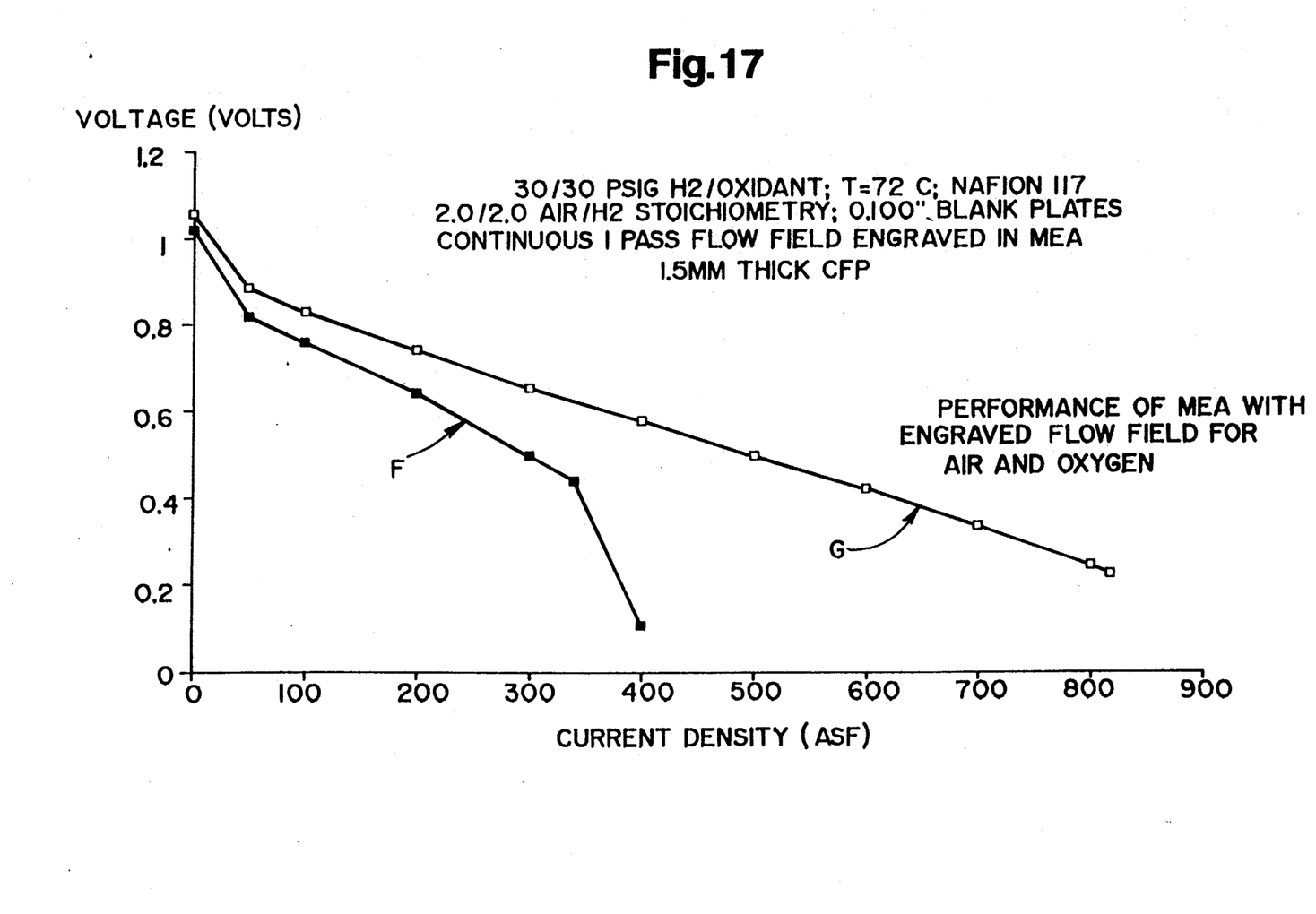
FIG. 17 is a composite of two polarization plots of cell voltage as a function of current density in a fuel cell repeating unit employing electrodes having integral reactant flow passages as shown in FIGS. 13 and 14, separator layers formed of 0.100 inch thickness graphite, using (1) oxygen-containing air as the oxidant stream (plot labeled "F") and (2) substantially pure oxygen as the oxidant stream (plot labeled "G").

FIG. 17 shows the performance of two fuel cells employing membrane electrode assemblies having integral reactant flow passages and employing different oxidant streams. The electrodes in each of the fuel cells of FIG. 17 had a single, continuous serpentine groove milled in their surfaces facing away from the membrane, as shown in FIGS. 13 and 14. The fuel cells employed a Nafion 117 (0.007 inch thick) ion exchange membrane, and were operated at a pressure of 30/30 psig oxidant-/hydrogen, a temperature of 72° C., and an air/hydrogen stoichiometry of 2.0/2.0. The electrodes were formed from 1.5 millimeter thick carbon fiber paper. The MEAs were interposed between blank, planar (ungrooved) separator plates formed of 0.100 inch thick graphite. Each of the fuel cells was interposed between two single-sided graphite cooling jackets.

The plot labeled "F" in FIG. 17 shows voltage as a function of current density (in amps per square foot) for the configuration employing oxygen-containing air (approximately 21% oxygen) as the oxidant. The plot labeled "G" in FIG. 17 shows voltage as a function of current density for the configuration employing substantially pure oxygen as the oxidant. The fuel cell employing substantially pure oxygen as the oxidant, namely, that shown in plot "G", exhibited higher voltages over a broader current density range than the fuel cell employing oxygen-containing air.

In summary, a thin, lightweight fuel cell is provided which employs a membrane electrode assembly having integral reactant flow passages. The location of the reactant flow passages in the electrode material permits the elimination of the thick separator plates in favor of thinner, lighter weight, gas impermeable separator layers. In combination with other repeating units, the present invention provides a fuel cell stack that provides higher power-to-volume and power-to-weight ratios than conventional repeating units having flow passages engraved, milled or molded in the separator plates. The location of the flow passages in the electrode material present also decreases the distance through which the reactants must migrate to reach the catalyst sites, thereby improving potential fuel cell performance. Finally, membrane electrode assemblies with integral reactant flow passages are less expensive to manufacture than conventional repeating units with flow passages milled in the rigid separator plates.

While particular elements and applications of the present invention have been shown and described, it will be understood, of course, that the invention is not limited thereto since modifications may be made by those skilled in the art, particularly in light of the foregoing teachings. It is therefore contemplated by the appended claims to cover such modifications and incorporate those features which come within the scope and spirit of the invention.

What is claimed is:

1. An electrochemical fuel cell for converting a fuel reactant stream and an oxidant reactant stream to a reaction product stream and electrical energy, said fuel cell comprising:
   first and second separator layers, said separator layers formed of electrically conductive sheet material, said sheet material substantially impermeable to said fuel and oxidant reactant streams;
   a membrane electrode assembly interposed between said first and second separator layers, said assembly comprising first and second electrode layers, said electrode layers formed of porous electrically conductive sheet material and having a catalyst associated therewith, and an ion exchange membrane interposed between said first and second electrode layers,
   said first electrode layer comprising a fuel stream inlet, a fuel stream outlet, and means for flowing said fuel stream within the sheet material of said first electrode layer between said fuel stream inlet and said fuel stream outlet;
   said second electrode layer comprising an oxidant stream inlet, an oxidant stream outlet, and means for flowing said oxidant stream within the sheet material of said second electrode layer between said oxidant stream inlet and said oxidant stream outlet.

2. The electrochemical fuel cell of claim 1 wherein said flow means comprises the interstitial spaces within the sheet material of at least one of said first and second electrode layers.

3. The electrochemical fuel cell of claim 2 wherein at least one of said electrode layers further comprises dam members for diverting the flow of the reactant stream within the sheet material of said at least one electrode layer.

4. The electrochemical fuel cell of claim 2 wherein at least one of said electrode layers further comprises capillaries for containing the reactant stream within the sheet material of said at least one electrode layer along at least a portion of the distance between the inlet and the outlet.

5. The electrochemical fuel cell of claim 1 wherein at least one of said electrode layers has at least one groove formed in the surface of the sheet material thereof facing away from said membrane and the surface of the adjacent separator layer facing said electrode layer is substantially planar, whereby the surface of said electrode layer and the adjacent surface of said separator layer cooperate to define a passage for the flow of a reactant stream within said electrode layer.

6. The electrochemical fuel cell of claim 5 wherein said at least one groove interconnects said fuel inlet and said fuel outlet.

7. The electrochemical fuel cell of claim 5 wherein said at least one groove comprises a first groove extending from said fuel inlet and a second groove extending from said fuel output, said second groove discontinuous from said first groove, whereby said fuel reactant stream flows from within said first groove to said second groove through the interstitial spaces of the sheet material of said first electrode layer.

8. The electrochemical fuel cell of claim 7 wherein said first groove and said second groove are branched, the branches of said first groove interdigitated with the branches of said second groove.

9. The electrochemical fuel cell of claim 5 wherein said at least one groove interconnects said oxidant inlet and said oxidant outlet.

10. The electrochemical fuel cell of claim 5 wherein said at least one groove comprises a first groove extending from said oxidant inlet and a second groove extending from said oxidant output, said second groove discontinuous from said first groove, whereby said oxidant reactant stream flows from within said first groove to said second groove through the interstitial spaces of the sheet material of said second electrode layer.

11. The electrochemical fuel cell of claim 10 wherein said first groove and said second groove are branched, the branches of said first groove interdigitated with the branches of said second groove.

12. The electrochemical fuel cell of claim 1 further comprising a coolant layer adjacent at least one of said separator layers on the side opposite said membrane electrode assembly, said coolant layer formed of electrically conductive sheet material, said coolant layer comprising means for flowing a coolant fluid within said coolant layer, whereby heat generated by said membrane electrode assembly is absorbed by said coolant.

13. The electrochemical fuel cell of claim 12 wherein said coolant fluid is air.

14. The electrochemical fuel cell of claim 12 wherein said coolant layer has at least one groove formed in the surface thereof facing said membrane electrode assembly and wherein the surface of the adjacent separator layer facing said coolant layer is substantially planar, whereby the surface of said coolant layer and the adjacent surface of said separator layer cooperate to define a passage for the flow of coolant within said coolant layer.

15. The electrochemical fuel cell of claim 14 wherein said coolant fluid is water.

16. The electrochemical fuel cell of claim 14 wherein said coolant fluid is ethylene glycol.

17. The electrochemical fuel cell of claim 1 wherein at least one of said electrode layers comprises means for flowing a coolant fluid within said membrane electrode assembly, whereby heat generated by said membrane electrode assembly is absorbed by said coolant fluid.

18. The electrochemical fuel cell of claim 17 wherein said flow means comprises capillaries for carrying said coolant fluid.

19. The electrochemical fuel cell of claim 17 wherein said coolant fluid is water.

20. The electrochemical fuel cell of claim 17 wherein said coolant fluid is ethylene glycol.

21. The electrochemical fuel cell of claim 1 wherein said separator plates include heat transfer surfaces extending therefrom and further comprising means for flowing a coolant fluid across said heat transfer surfaces, whereby heat generated by said membrane electrode assembly is absorbed by said coolant fluid.

22. The electrochemical fuel cell of claim 21 wherein said coolant fluid is air and said coolant flow means is a fan.

23. The electrochemical fuel cell of claim 1 wherein said electrode layers are formed of carbon fiber paper.

24. The electrochemical fuel cell of claim 1 wherein said separator layers are formed of a graphite composition.

25. The electrochemical fuel cell of claim 24 wherein said separator layers are formed of graphite foil.

26. The electrochemical fuel cell of claim 1 wherein said separator layers are formed of a niobium composition.

27. The electrochemical fuel cell of claim 1 wherein said separator layers are formed of a titanium composition.

28. The electrochemical fuel cell of claim 1 wherein said fuel is hydrogen and said oxidant is oxygen.

29. The electrochemical fuel cell of claim 1 wherein said catalyst comprises platinum.

30. The electrochemical fuel cell of claim 1 wherein said catalyst comprises a compound including platinum.

31. The electrochemical fuel cell of claim 5 wherein the side walls of said at least one groove are coated with a sealant, said sealant substantially impermeable to the reactant flowing within said at least one groove, whereby the flow of said reactant is directed toward said catalyst.

* * * * *